United States Patent
Kinoshita et al.

(10) Patent No.: US 11,174,869 B1
(45) Date of Patent: Nov. 16, 2021

(54) ROTARY MACHINE

(71) Applicant: MITSUBISHI HEAVY INDUSTRIES COMPRESSOR CORPORATION, Tokyo (JP)

(72) Inventors: Takuya Kinoshita, Hiroshima (JP); Yu Sayama, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 344 days.

(21) Appl. No.: 16/479,633

(22) PCT Filed: Feb. 17, 2017

(86) PCT No.: PCT/JP2017/005882
§ 371 (c)(1),
(2) Date: Jul. 22, 2019

(87) PCT Pub. No.: WO2018/150534
PCT Pub. Date: Aug. 23, 2018

(51) Int. Cl.
*F04D 29/10* (2006.01)
*F04D 17/08* (2006.01)
*F04D 29/12* (2006.01)

(52) U.S. Cl.
CPC ............. *F04D 29/10* (2013.01); *F04D 17/08* (2013.01); *F04D 29/12* (2013.01)

(58) Field of Classification Search
None
See application file for complete search history.

(56) References Cited

U.S. PATENT DOCUMENTS

| 3,005,518 | A | 10/1961 | Jassniker |
| 4,544,167 | A | 10/1985 | Giroux |
| 6,802,689 | B2 * | 10/2004 | Nogiwa ............... F04D 27/0292 415/26 |

(Continued)

FOREIGN PATENT DOCUMENTS

| JP | 2007-177887 A | 7/2007 |
| JP | 2012-107609 A | 6/2012 |
| WO | 2016/030845 A1 | 3/2016 |

OTHER PUBLICATIONS

International Search Report issued in corresponding International Patent Application No. PCT/JP2017/005882, dated May 9, 2017 (4 pages).

(Continued)

*Primary Examiner* — Michael Lebentritt
*Assistant Examiner* — Jason G Davis
(74) *Attorney, Agent, or Firm* — Osha Bergman Watanabe & Burton LLP

(57) ABSTRACT

A rotary machine includes a rotating shaft which is rotatably provided around an axis, a casing which covers the rotating shaft from an outside in a radial direction and in which a gas flow path extending in a circumferential direction is formed, a drain pipe which is connected to a lower portion in a vertical direction of the casing and communicates with the gas flow path, an adjusting valve which is provided in the drain pipe and adjusts a flow state of a fluid in the drain pipe, and a gas flow pipe which is connected to the drain pipe at a position closer to a connection portion between the casing and the drain pipe than the adjusting valve and through which the seal gas flows.

13 Claims, 3 Drawing Sheets

(56) References Cited

U.S. PATENT DOCUMENTS

| | | | |
|---|---|---|---|
| 9,624,785 B2* | 4/2017 | Doumecq-Lacoste | ....................... F16K 31/0644 |
| 9,791,046 B2* | 10/2017 | Hori | ........................ F16J 15/40 |
| 2007/0147988 A1 | 6/2007 | Ito et al. | |
| 2013/0195649 A1 | 8/2013 | Kitano et al. | |
| 2019/0271325 A1* | 9/2019 | Masuda | .............. F04D 29/0516 |

OTHER PUBLICATIONS

Written Opinion issued in corresponding International Patent Application No. PCT/JP2017/005882, dated May 9, 2017 (4 pages).

* cited by examiner

ROTARY MACHINE

TECHNICAL FIELD

The present invention relates to a rotary machine.

BACKGROUND ART

In a rotary machine such as a centrifugal compressor, an end portion of a rotating shaft may protrude to an outside of a casing in order to input or output a rotation of the rotating shaft which is rotatably provided on the casing. In the rotary machine, it is necessary to prevent a working fluid from leaking from a gap between the rotating shaft and the casing to the outside of the casing and foreign matter or the like from entering an inside of the casing from the outside thereof. Accordingly, in the rotary machine, a configuration in which a seal portion is provided between the rotating shaft and the casing is used. Particularly, in a case of the centrifugal compressor, a dry gas seal is used as the seal portion.

The dry gas seal includes a rotating ring and a stationary ring. The rotating ring is integrally provided with the rotating shaft on an outer peripheral portion of the rotating shaft. The stationary ring is fixed to the casing and is provided to face the rotating ring in an axial direction of the rotating shaft. The stationary ring is pressed toward the rotating ring by a coil spring or the like. Accordingly, in a state where the rotary machine stops, the stationary ring and the rotating ring abut against each other.

A spiral groove is formed on a surface of the rotating ring facing the stationary ring. If the rotary machine is operated and the rotating shaft rotates, a seal gas is introduced into a portion between the rotating ring and the stationary ring through the spiral groove. The stationary ring is pressed against a biasing force of the coil spring along the axial direction of the rotating shaft by a pressure of the seal gas. Accordingly, a minute gap is formed between the rotating ring and the stationary ring, and thus, leakage of an internal fluid from an inside of the machine to an outside of the machine is minimized.

PTL 1 discloses a compressor which has a dry gas seal including a rotating ring and a stationary ring. This compressor includes a seal gas flow path through which a seal gas is supplied, and a drain gas flow path through which a drain is discharged. The drain gas flow path is connected to a casing on a lower portion of the rotating ring and is connected to a suction flow path connected to a suction port of a compressor body. In the compressor, the drain and the seal gas are returned to the suction flow path through the drain gas flow path.

CITATION LIST

Patent Literature

[PTL 1] Japanese Unexamined Patent Application, First Publication No. 2012-107609

SUMMARY OF INVENTION

Technical Problem

However, in the casing, a plurality of pipes such as a pipe through which the seal gas is supplied, a pipe through which a leakage gas is discharged, and a pipe through which a collected drain is discharged are connected to a portion in which the dry gas seal portion is provided. As a result, paths of the pipes around the casing may be complicated. Therefore, there is a demand to reduce the number of pipes directly connected to the casing.

The present invention provides a rotary machine capable of reducing the number of pipes directly connected to the casing.

Solution to Problem

According to a first aspect of the present invention, a rotary machine is provided, including: a rotating shaft which is rotatably provided around an axis extending in a horizontal direction; a casing which covers the rotating shaft from an outside in a radial direction of the rotating shaft and in which a gas flow path extending in a circumferential direction of the rotating shaft is formed; a rotating ring which integrally rotates with the rotating shaft; a stationary ring which is provided in the casing, abuts against the entire periphery of the rotating ring when the rotating shaft stops, and forms a seal gap between the rotating ring and the stationary ring by a seal gas flowing through the gas flow path when the rotating shaft rotates; a drain pipe which is connected to a lower portion in a vertical direction of the casing and communicates with the gas flow path; an adjusting valve which is provided in the drain pipe and adjusts a flow state of a fluid in the drain pipe; and a gas flow pipe which is connected to the drain pipe at a position closer to a connection portion between the casing and the drain pipe than the adjusting valve and through which the seal gas flows.

According to this configuration, the gas flow pipe through which the seal gas flows is connected to the casing via the drain pipe through which drain flows. Accordingly, it is possible to connect the drain pipe and the gas flow pipe to the casing by one connection portion without impairing flow states of the seal gas and the drain.

In the rotary machine of a second aspect of the present invention, in the first aspect, the gas flow pipe may be a seal gas supply pipe through which the seal gas to be supplied to the gas flow path flows.

In the rotary machine of a third aspect of the present invention, in the first aspect, the gas flow pipe may be a seal gas discharge pipe through which the seal gas discharged from the gas flow path flows.

In the rotary machine of a fourth aspect of the present invention, in any one of the first to third aspects, the gas flow pipe may extend from the drain pipe in a direction including an upper side in the vertical direction.

According to this configuration, even when the liquid drain flowing through the drain pipe downward in the vertical direction reaches a connection portion between the drain pipe and the gas flow pipe, the drain does not flow in a direction including the upper side in the vertical direction. Accordingly, it is possible to prevent the drain from flowing into the gas flow pipe.

In the rotary machine of a fifth aspect of the present invention, in any one of the first to fourth aspects, a check valve may be provided in the gas flow pipe.

According to this configuration, the flow direction of the fluid in the gas flow pipe is regulated by the check valve. Accordingly, it is possible to accurately prevent the liquid drain flowing through the drain pipe from flowing inward from the gas flow pipe.

In the rotary machine of a sixth aspect of the present invention, in any one of the first to fifth aspects, the drain pipe may include a window portion through which an inside of the drain pipe is checked.

According to this configuration, an amount of the drain in the drain pipe can be easily checked by the window portion. Therefore, it is possible to appropriately discharge the drain in the drain pipe.

Advantageous Effects of Invention

According to the present invention, it is possible to reduce the number of pipes directly connected to the casing.

DESCRIPTION OF EMBODIMENTS

Hereinafter, an embodiment of a rotary machine system of the present invention will be described with reference to the drawings.

Figure 1:
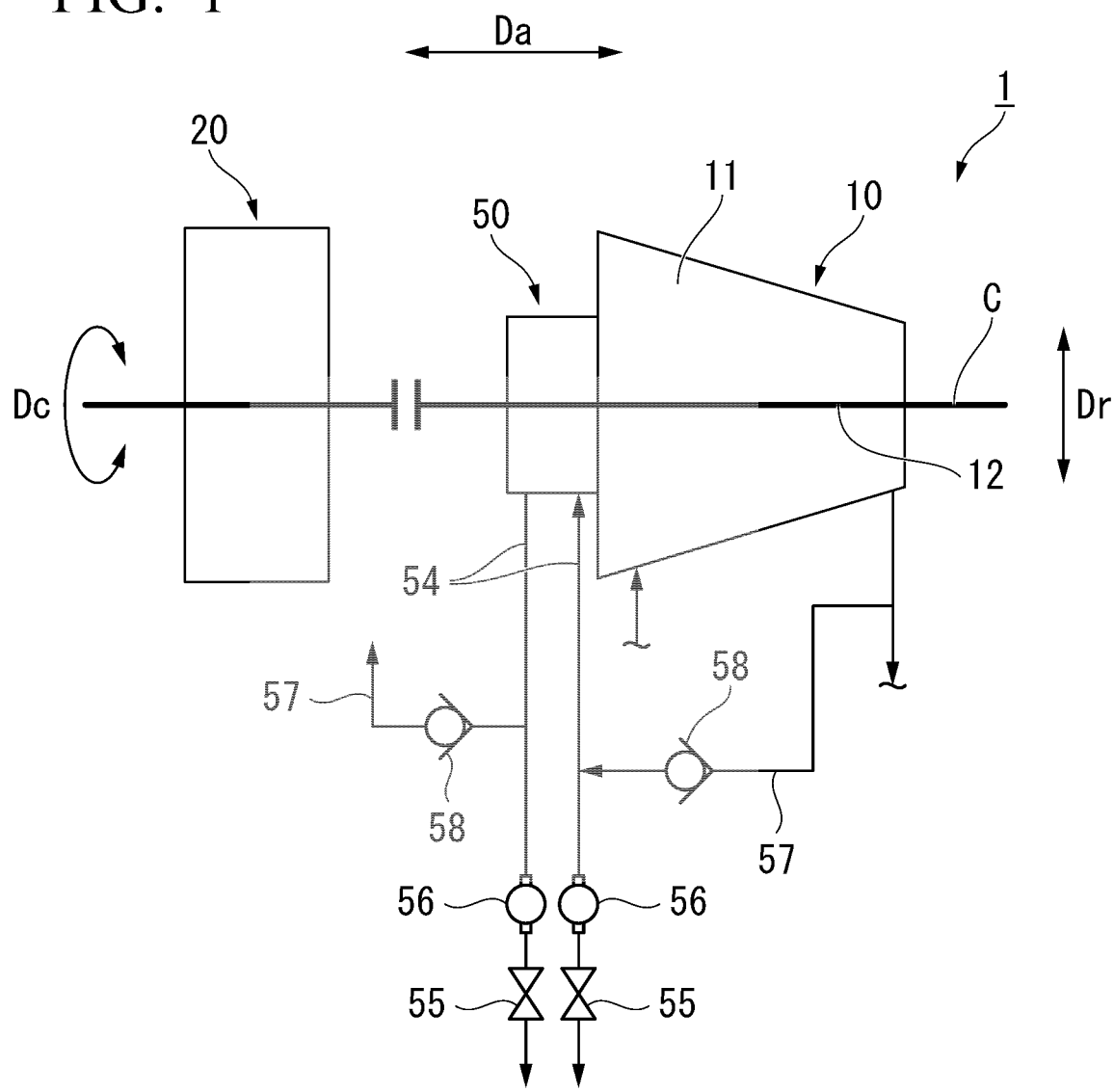
FIG. 1 is a diagram showing a schematic configuration of a rotary machine system having a compressor as an example of a rotary machine in the present embodiment.

As shown in FIG. 1, a rotary machine system 1 includes a compressor (rotary machine) 10 and a turbine 20 which is a drive source driving the compressor 10.

For example, the compressor 10 is a centrifugal compressor. The compressor 10 includes a casing 11, a rotating shaft 12, and a seal portion 50.

The casing 11 covers the rotating shaft 12 from an outside in a radial direction Dr of the rotating shaft 12. The rotating shaft 12 is rotatably provided in the casing 11 around an axis C extending in a horizontal direction. An impeller (not shown) which compresses a process gas serving as a working fluid is fixed to the rotating shaft 12. In addition, in the present embodiment, the horizontal direction in which the axis C extends is not limited only to a direction completely orthogonal to the vertical direction, and the rotating shaft 12 may be inclined slightly to an allowable degree when the compressor 10 is installed.

Moreover, hereinafter, the direction in which the axis C of the rotating shaft 12 extends is referred to as an axial direction Da. A radial direction of the rotating shaft 12 based on the axis C is simply referred to as a radial direction Dr. Moreover, a direction around the rotating shaft 12 about the axis C is referred to as a circumferential direction Dc.

The seal portion 50 is provided on a suction side (the side closer to the turbine 20 with respect to the compressor 10 in the axial direction Da) of the compressor 10. The seal portion 50 is provided in a portion of the rotating shaft 12 which penetrates an end portion of the casing 11 and protrudes toward the outside.

Figure 2:
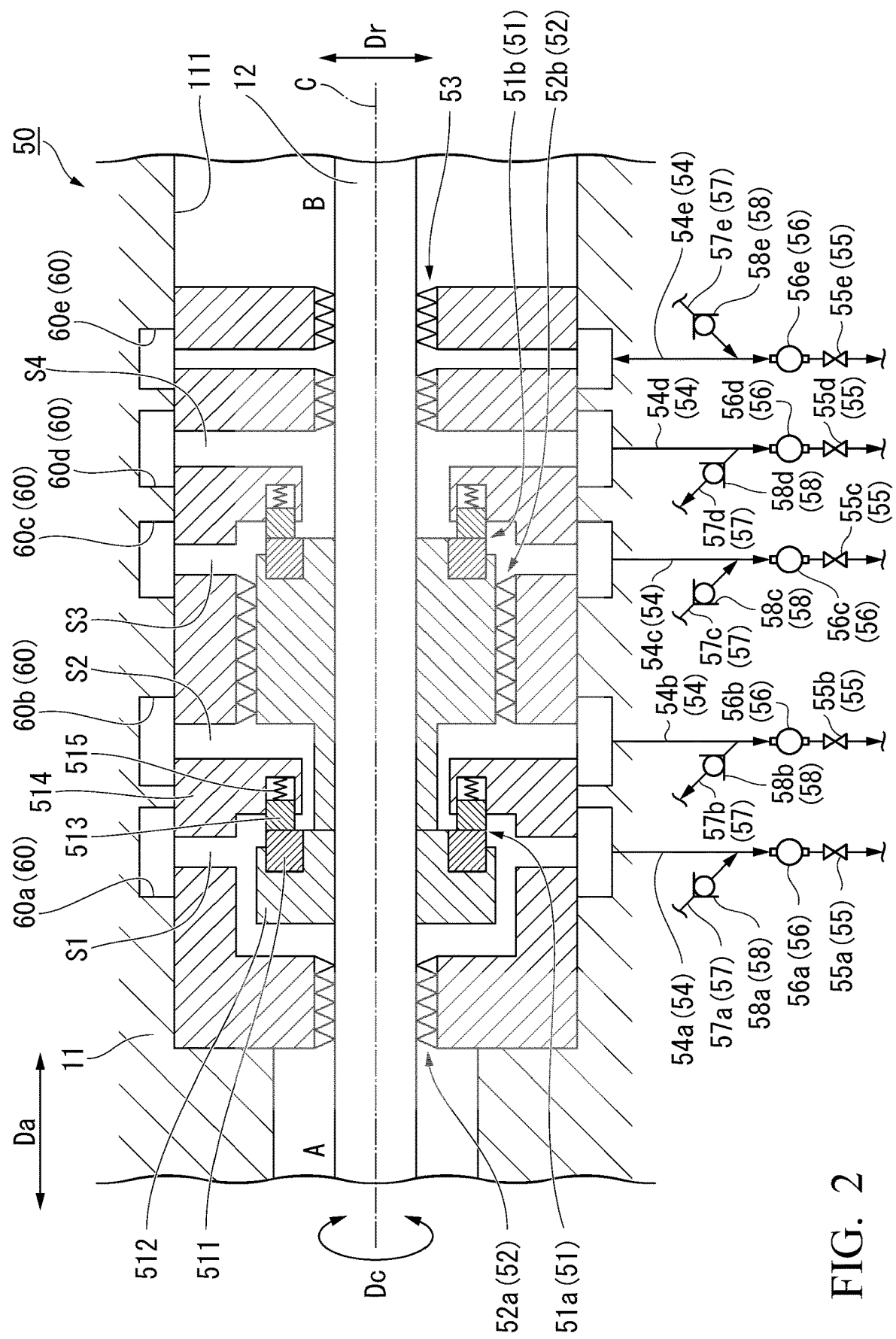
FIG. 2 is a diagram showing a configuration of a gas seal portion provided in the compressor in the present embodiment.

As shown in FIG. 2, the seal portion 50 includes a plurality of dry gas seal portions 51, a plurality of labyrinth seal portions 52, a separation seal portion 53, a plurality of drain pipes 54, a plurality of adjusting valves 55, and a plurality of gas flow pipes 57.

A seal gas is supplied to one of the dry gas seal portions 51, and thus, a portion between an inside A of the rotary machine, which is an inside of the casing 11, and an outside B of the rotary machine, which is an outside of the casing 11, is sealed. Each of the dry gas seal portions 51 includes a rotating ring 511 and a stationary ring 513.

The rotating ring 511 is integrally rotated with the rotating shaft 12. The rotating ring 511 is fixed to an outer peripheral surface of the rotating shaft 12. A tubular shaft sleeve 512 is fixed to an outer peripheral surface of the rotating shaft 12. The rotating ring 511 is formed in an annular shape and is fitted to the shaft sleeve 512 and is held. A spiral groove (not shown) is provided on a surface of the rotating ring 511 facing the stationary ring 513.

The stationary ring 513 is provided in the casing 11. The stationary ring 513 abuts against the entire periphery of the rotating ring 511 when the rotating shaft 12 stops, and a seal gap is formed between the rotating ring 511 and the stationary ring 513 by a seal gas flowing through a gas flow path 60 when the rotating shaft 12 rotates.

The casing 11 includes a shaft insertion hole 111 into which an end portion of the rotating shaft 12 penetrating the inside and the outside of the casing 11 is inserted. An annular retainer 514 is provided on an inner peripheral surface of the shaft insertion hole 111. A stationary ring 513 which can slide in the axial direction Da of the rotating shaft 12 is provided on a concave portion formed in the retainer 514. The stationary ring 513 is connected to the retainer 514 via a coil spring 515 biased toward the rotating ring 511.

The rotating ring 511 and the stationary ring 513 are provided to face each other in the axial direction Da of the rotating shaft 12. The stationary ring 513 is pressed toward the rotating ring 511 by the coil spring 515.

The dry gas seal portion 51 of the present embodiment includes a first dry gas seal portion 51a and a second dry gas seal portion 51b. The first dry gas seal portion 51a is positioned closer to the inside A of the rotary machine in the casing 11 along the axial direction Da of the rotating shaft 12 than the second dry gas seal portion 51b. A portion of a process gas as the seal gas which is compressed in the compressor 10 is supplied to the first dray gas seal portion 51a through a filter. A gaseous inert gas such as nitrogen having a pressure lower than a pressure of the process gas is supplied to the second dry gas seal portion 51b as the seal gas.

A portion between the labyrinth seal portion 52 and the outer peripheral surface of the rotating shaft 12 is sealed by a plurality of seal pins. The labyrinth seal portion 52 of the present embodiment includes a first labyrinth seal portion 52a and a second labyrinth seal portion 52b. The first labyrinth seal portion 52a is disposed closer to the inside A of the rotary machine in the axial direction Da than the second dry gas seal portion 51b. The second labyrinth seal portion 52b is disposed between the first dry gas seal portion 51a and the second dry gas seal portion 51b in the axial direction Da.

The separation seal portion 53 supplies a gaseous separation gas as the seal gas and prevents a lubricant used in a bearing positioned closer to the outside B of the rotary machine than the separation seal portion 53 from entering the dry gas seal portion 51. The separation gas may be an inert gas such as nitrogen.

In the seal portion 50 of the present embodiment, the first labyrinth seal portion 52a, the first dry gas seal portion 51a, the second labyrinth seal portion 52b, the second dry gas seal portion 51b, and the separation seal portion 53 are arranged in this order from the inside A of the rotary machine to the outside B of the rotary machine in the casing 11 along the axial direction Da.

In the shaft insertion hole 111, a first space S1 is formed between the first labyrinth seal portion 52a and the first dry gas seal portion 51a. The rotating shaft 12 is inserted into the shaft insertion hole 111, and thus, a plurality of the first spaces S1 are formed to be separated from each other on a circumference about the axis C when viewed in the axial direction Da. The seal gas flowing into the first dry gas seal portion 51a flows through the first space S1.

In the shaft insertion hole 111, a second space S2 is formed between the first dry gas seal portion 51a and the second labyrinth seal portion 52b. The rotating shaft 12 is inserted into the shaft insertion hole 111, and thus, a plurality of the second spaces S2 are formed to be separated from each other on the circumference about the axis C when viewed in the axial direction Da. The seal gas flowing out from the first dry gas seal portion 51a flows through the second space S2.

In the shaft insertion hole 111, a third space S3 is formed between the second labyrinth seal portion 52b and the second dry gas seal portion 51b. The rotating shaft 12 is inserted into the shaft insertion hole 111, and thus, a plurality of the third spaces S3 are formed to be separated from each other on the circumference about the axis C when viewed in the axial direction Da. The seal gas flowing into the second dry gas seal portion 51b flows through the third space S3.

In the shaft insertion hole 111, a fourth space S4 is formed between the second dry gas seal portion 51b and the separation seal portion 53. The rotating shaft 12 is inserted into the shaft insertion hole 111, and thus, a plurality of the fourth spaces S4 are formed to be separated from each other on the circumference about the axis C when viewed in the axial direction Da. The seal gas flowing out from the second dry gas seal portion 51b flows through the fourth space S4.

Moreover, the gas flow path 60 extending in the circumferential direction Dc of the rotating shaft 12 is formed in the casing 11. The gas flow path 60 of the present embodiment is formed to surround the shaft insertion hole 111 from the outside in the radial direction Dr. The gas flow path 60 is formed in an annular shape about the axis C. In the present embodiment, as the gas flow path 60, a first gas flow path 60a communicating with the first space S1, a second gas flow path 60b communicating with the second space S2, a third gas flow path 60c communicating with the third space S3, a fourth gas flow path 60d communicating with the fourth space S4, and a fifth gas flow path 60e communicating with the separation seal portion 53 are formed in the casing 11.

The first gas flow path 60a is formed in an annular shape so as to surround the first space S1 from the outside. The first gas flow path 60a is open in a plurality of locations on the inner peripheral surface of the shaft insertion hole 111. That is, the first gas flow path 60a communicates with the first space S1 at the plurality of locations in the circumferential direction Dc.

The second gas flow path 60b is formed in an annular shape to surround the second space S2 from the outer peripheral side in a position closer to the outside B of the rotary machine in the axial direction Da than the first gas flow path 60a. The second gas flow path 60b is open in a plurality of locations on the inner peripheral surface of the shaft insertion hole 111. That is, the second gas flow path 60b communicates with the second space S2 at the plurality of locations in the circumferential direction Dc.

The third gas flow path 60c is formed in an annular shape to surround the third space S3 from the outer peripheral side in a position closer to the outside B of the rotary machine in the axial direction Da from the second gas flow path 60b. The third gas flow path 60c is open in a plurality of locations on the inner peripheral surface of the shaft insertion hole 111. That is, the third gas flow path 60c communicates with the third space S3 at the plurality of locations in the circumferential direction Dc.

The fourth gas flow path 60d is formed in an annular shape to surround the fourth space S4 from the outer peripheral side in a position closer to the outside B of the rotary machine in the axial direction Da than the third gas flow path 60c. The fourth gas flow path 60d is open in a plurality of locations on the inner peripheral surface of the shaft insertion hole 111. That is, the fourth gas flow path 60d communicates with the fourth space S4 at the plurality of locations in the circumferential direction Dc.

The fifth gas flow path 60e is formed in an annular shape to surround the separation seal portion 53 from the outer peripheral side in a position closer to the outside B of the rotary machine in the axial direction Da than the fourth gas flow path 60d. The fifth gas flow path 60e is open in a plurality of locations on the inner peripheral surface of the shaft insertion hole 111. That is, the fifth gas flow path 60e communicates with the separation seal portion 53 at the plurality of locations in the circumferential direction Dc.

Figure 3:
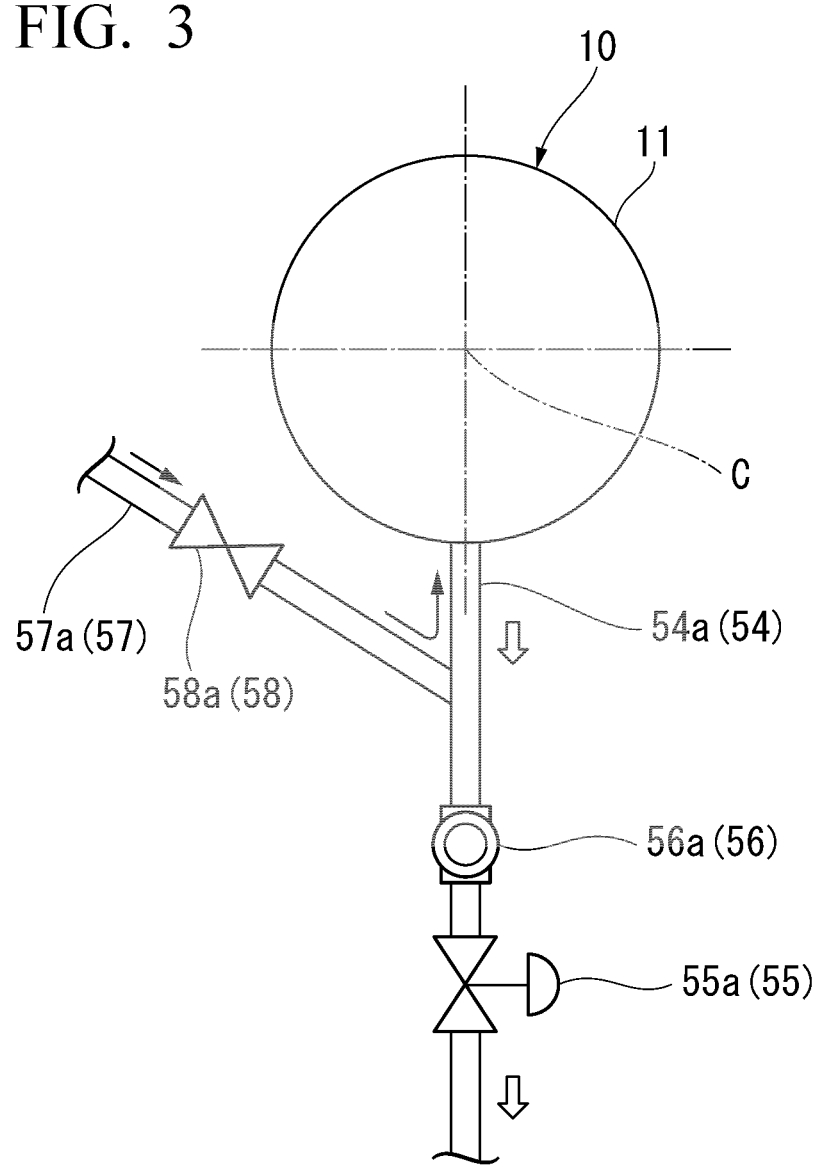
FIG. 3 is a diagram showing a configuration when the compressor and a drain pipe in the present embodiment are viewed in an axial direction.

The drain pipe 54 is connected to the gas flow path 60. A drain collected in the gas flow path 60 is discharged to the outside through the drain pipe 54. An operation of the compressor 10 stops, a temperature or a pressure in the shaft insertion hole 111 decreases, and thus, the seal gas is liquefied, and the drain may be generated. As shown in FIG. 3, the drain pipe 54 is connected to a lower portion of the casing 11 in the vertical direction. The drain pipe 54 communicates with the gas flow path 60 in the casing 11. An end portion of the drain pipe 54 which is not connected to the casing 11 is connected to the outside. The drain pipe 54 extends straight in a direction including a downward direction in the vertical direction from a connection portion between the drain pipe 54 and the casing 11. It is preferable that the drain pipe 54 extend downward from the connection portion between the drain pipe 54 and the casing 11 rather than in the horizontal direction. Here, the lower portion in the vertical direction may include not only a lowest portion in the vertical direction but also a predetermined region including the lowest portion in the vertical direction. In addition, in the drain pipe 54 of the present embodiment is connected to the lowest portion of the casing 11 in the vertical direction.

As shown in FIGS. 2 and 3, the drain pipe 54 includes an adjusting valve 55 and a sight glass (window portion) 56. The adjusting valve 55 adjusts a flow state of a fluid in the drain pipe 54. In the present embodiment, the adjusting valve 55 is opened from a closed state in a manual manner, and thus, the drain in the drain pipe 54 flows toward the outside which is a portion below the adjusting valve 55 in the vertical direction.

The inside of the drain pipe 54 can be checked by the sight glass 56. The sight glass 56 is provided at a position closer to the connection portion between the casing 11 and the drain pipe 54 than the adjusting valve 55. It is preferable that the sight glass 56 be provided at a position capable of checking an on and/or off state of the adjusting valve 55.

As shown in FIG. 2, in the present embodiment, the drain pipe 54 includes a first drain pipe 54a, a second drain pipe 54b, a third drain pipe 54c, a fourth drain pipe 54d, and a fifth drain pipe 54e.

The first drain pipe 54a is connected to the first gas flow path 60a. The first drain pipe 54a communicates with the first gas flow path 60a at the lowest portion of the casing 11 in the vertical direction. The first drain pipe 54a extends straight downward in the vertical direction. The first drain pipe 54a includes a first adjusting valve 55a as the adjusting valve 55. The first drain pipe 54a includes a first sight glass 56a as the sight glass 56. The first sight glass 56a is provided closer to the casing 11 side than the first adjusting valve 55a.

The second drain pipe 54b is connected to the second gas flow path 60b. The second drain pipe 54b communicates with the second gas flow path 60b at the lowest portion of the casing 11 in the vertical direction. The second drain pipe 54b extends straight downward in the vertical direction. The second drain pipe 54b includes a second adjusting valve 55b as the adjusting valve 55. The second drain pipe 54b includes a second sight glass 56b as the sight glass 56. The second sight glass 56b is provided closer to the casing 11 side than the second adjusting valve 55b.

The third drain pipe 54c is connected to the third gas flow path 60c. The third drain pipe 54c communicates with the third gas flow path 60c at the lowest portion of the casing 11 in the vertical direction. The third drain pipe 54c extends straight downward in the vertical direction. The third drain pipe 54c includes a third adjusting valve 55c as the adjusting valve 55. The third drain pipe 54c includes a third sight glass 56c as the sight glass 56. The third sight glass 56c is provided closer to the casing 11 side than the third adjusting valve 55c.

The fourth drain pipe 54d is connected to the fourth gas flow path 60d. The fourth drain pipe 54d communicates with the fourth gas flow path 60d at the lowest portion of the casing 11 in the vertical direction. The fourth drain pipe 54d extends straight downward in the vertical direction. The fourth drain pipe 54d includes a fourth adjusting valve 55d as the adjusting valve 55. The fourth drain pipe 54d includes a fourth sight glass 56d as the sight glass 56. The fourth sight glass 56d is provided closer to the casing 11 side than the fourth adjusting valve 55d.

The fifth drain pipe 54e is connected to the fifth gas flow path 60e. The fifth drain pipe 54e communicates with the fifth gas flow path 60e at the lowest portion of the casing 11 in the vertical direction. The fifth drain pipe 54e extends straight downward in the vertical direction. The fifth drain pipe 54e includes a fifth adjusting valve 55e as the adjusting valve 55. The fifth drain pipe 54e includes a fifth sight glass 56e as the sight glass 56. The fifth sight glass 56e is provided closer to the casing 11 side than the fifth adjusting valve 55e.

As shown in FIG. 3, the gas flow pipe 57 through which the seal gas flows is connected to the drain pipe 54. The gas flow pipe 57 is a pipe through which the seal gas to be supplied to the gas flow path 60 or the seal gas discharged from the gas flow path 60 flows. The gas flow pipe 57 is connected to the drain pipe 54 at a position closer to the connection portion between the casing 11 and the drain pipe 54 than the adjusting valve 55. The gas flow pipe 57 extends in a direction including an upper side in the vertical direction from the drain pipe 54. Specifically, in the present embodiment, the gas flow pipe 57 is inclined to extend upward with respect to the horizontal direction from a connection portion between the drain pipe 54 and the gas flow pipe 57. The gas flow pipe 57 includes a check valve 58 which limits a flow direction of the seal gas flowing through the gas flow pipe 57 to one side.

As shown in FIG. 2, in the present embodiment, the seal portion 50 includes a first seal gas supply pipe 57a, a first seal gas discharge pipe 57b, a second seal gas supply pipe 57c, a second seal gas discharge pipe 57d, and a separation gas supply pipe 57e, as the gas flow pipe 57.

The seal gas to be supplied to the first gas flow path 60a flows through the first seal gas supply pipe 57a. Accordingly, the seal gas is supplied to the seal gap of the first dry gas seal portion 51a through the first seal gas supply pipe 57a. A portion of the process gas compressed by the compressor 10 is supplied as the seal gas through the first seal gas supply pipe 57a. The first seal gas supply pipe 57a is connected to the first drain pipe 54a. In the present embodiment, the first seal gas supply pipe 57a is connected to the first drain pipe 54a at a position closer to the connection portion between the casing 11 and the first drain pipe 54a than the first sight glass 56a and the first adjusting valve 55a. The first seal gas supply pipe 57a extends obliquely upward from the first drain pipe 54a. A first check valve 58a which allows only a flow of the seal gas toward the first drain pipe Ma is provided in the first seal gas supply pipe 57a. The seal gas is supplied to the first dry gas seal portion 51a via the first drain pipe Ma, the first gas flow path 60a, and the first space S1 through the first seal gas supply pipe 57a.

The seal gas discharged from the second gas flow path 60b flows through the first seal gas discharge pipe 57b. Accordingly, the seal gas which has flowed through the seal gap of the first dry gas seal portion 51a is discharged through the first seal gas discharge pipe 57b. The first seal gas discharge pipe 57b is connected to a flare stack (not shown). Moreover, in the flare stack, the seal gas is incinerated and is discharged to the outside. In the first seal gas discharge pipe 57b, an end portion which is not connected to the flare stack is connected to the second drain pipe 54b. In the present embodiment, the first seal gas discharge pipe 57b is connected to the second drain pipe 54b at a position closer to the connection portion between the casing 11 and the second drain pipe 54b than the second sight glass 56b and the second adjusting valve 55b. The first seal gas discharge pipe 57b extends obliquely upward from the second drain pipe 54b. A second check valve 58b which allows only a flow of the seal gas from the second drain pipe 54b toward the flare stack is provided in the first seal gas discharge pipe 57b. That is, the second check valve 58b allows the flow of the seal gas in a direction opposite to the flow of the seal gas allowed by the first check valve 58a. The seal gas discharged from the first dry gas seal portion 51a is discharged through the first seal gas discharge pipe 57b via the second space S2, the second gas flow path 60b, and the second drain pipe 54b.

The seal gas to be supplied to the third gas flow path 60c flows through the second seal gas supply pipe 57c. Accordingly, the seal gas is supplied to the seal gap of the second dry gas seal portion 51b through the second seal gas supply pipe 57c. An inert gas is supplied as the seal gas through the second seal gas supply pipe 57c. The second seal gas supply pipe 57c is connected to the third drain pipe 54c. In the present embodiment, the second seal gas supply pipe 57c is connected to the third drain pipe 54c at a position closer to the connection portion between the casing 11 and the third drain pipe 54c than the third sight glass 56c and the third adjusting valve 55c. The second seal gas supply pipe 57c extends obliquely upward from the third drain pipe 54c. A third check valve 58c which allows only a flow of the seal gas toward the third drain pipe 54c is provided in the second seal gas supply pipe 57c. The third check valve 58c allows the flow of the seal gas in the same direction as that of the flow of the seal gas allowed by the first check valve 58a. The seal gas is supplied to the second dry gas seal portion 51b via the third drain pipe 54c, the third gas flow path 60c, and the third space S3 through the second seal gas supply pipe 57c.

The seal gas discharged from the fourth gas flow path 60d flows through the second seal gas discharge pipe 57d. Accordingly, the seal gas which has flowed through the seal gap of the second dry gas seal portion 51b is discharged through the second seal gas discharge pipe 57d. The second seal gas discharge pipe 57d is connected to a vent. In the second seal gas discharge pipe 57d, an end portion which is not connected to the vent is connected to the fourth drain pipe 54d. In the present embodiment, the second seal gas discharge pipe 57d is connected to the fourth drain pipe 54d at a position closer to the connection portion between the casing 11 and the fourth drain pipe 54d than the fourth sight glass 56d and the fourth adjusting valve 55d. The second seal gas discharge pipe 57d extends obliquely upward from the fourth drain pipe 54d. A fourth check valve 58d which allows only a flow of the seal gas from the fourth drain pipe 54d toward the vent is provided in the second seal gas discharge pipe 57d. That is, the fourth check valve 58d allows the flow of the seal gas in the same direction as that of the flow of the seal gas allowed by the second check valve 58b. The seal gas discharged from the second dry gas seal portion 51b is discharged through the second seal gas discharge pipe 57d via the fourth space S4, the fourth gas flow path 60d, and the fourth drain pipe 54d.

The seal gas to be supplied to the fifth gas flow path 60e flows through the separation gas supply pipe 57e. Accordingly, the seal gas is supplied to the separation seal portion 53 through the separation gas supply pipe 57e. An inert gas is supplied through the separation gas supply pipe 57e as the seal gas. The separation gas supply pipe 57e is connected to the fifth drain pipe 54e. In the present embodiment, the separation gas supply pipe 57e is connected to the fifth drain pipe 54e at a position closer to the connection portion between the casing 11 and the fifth drain pipe 54e than the fifth sight glass 56e and the fifth adjusting valve 55e. The separation gas supply pipe 57e extends obliquely upward from the fifth drain pipe 54e. A fifth check valve 58e which allows only the flow of the seal gas toward the fifth drain pipe 54e is provided in the separation gas supply pipe 57e. The fifth check valve 58e allows the flow of the seal gas in the same direction as that of the flow of the seal gas allowed by the first check valve 58a. The seal gas is supplied to the separation seal portion 53 through the separation gas supply pipe 57e via the fifth drain pipe 54e and the fifth gas flow path 60e.

In the above-described compressor 10, in the first dry gas seal portion 51a and the second dry gas seal portion 51b, the stationary ring 513 and the rotating ring 511 abut against each other in a state where the compressor 10 stops. According to the operation of the compressor 10, a portion of the compressed process gas is fed to the first seal gas supply pipe 57a as the seal gas. The first adjusting valve 55a is closed, and thus, the seal gas which has flowed through the first seal gas supply pipe 57a flows into the first gas flow path 60a through the first drain pipe Ma. The seal gas which has flowed into the first gas flow path 60a is supplied to the first dry gas seal portion 51a via the first space S1. If the compressor 10 is operated and the rotating shaft 12 is rotated, the seal gas is introduced to a portion between the rotating ring 511 and the stationary ring 513 from the first space S1 through the spiral groove provided on the surface of the rotating ring 511. The stationary ring 513 is pressed toward the outside B of the rotary machine along the axial direction Da of the rotating shaft 12 against the biasing force of the coil spring 515 by a pressure of the seal gas. Accordingly, a minute seal gap is formed between the rotating ring 511 and the stationary ring 513. In this way, the minute gap is formed in the first dry gas seal portion 51a, and thus, a portion between the rotating shaft 12 and the casing 11 is sealed by the first dry gas seal portion 51a. Moreover, the seal gas which has flowed into the first space S1 flows to the inside A of the rotary machine through the first labyrinth seal portion 52a, and a portion of the seal gas flows toward the outside B of the rotary machine through the first dry gas seal portion 51a. A portion of the seal gas which has flowed through the first dry gas seal portion 51a flows into the second gas flow path 60b via the second space S2. The seal gas which has flowed to the second gas flow path 60b is fed to the second drain pipe 54b. The seal gas which has flowed through the second drain pipe 54b is fed to the flare stack through the first seal gas discharge pipe 57b by closing the second adjusting valve 55b.

Similarly, the inert gas is fed from a supply source (not shown) to the second seal gas supply pipe 57c as the seal gas. The seal gas which has flowed through the second seal gas supply pipe 57c flows to the third gas flow path 60c through the third drain pipe Mc by closing the third adjusting valve 55c. The seal gas which has flowed into the third gas flow path 60c is supplied to the second dry gas seal portion 51b via the third space S3. If the compressor 10 is operated and the rotating shaft 12 is rotated, the seal gas is introduced from the third space S3 to a portion between the rotating ring 511 and the stationary ring 513 by the spiral groove provided on the surface of the rotating ring 511. The stationary ring 513 is pressed toward the outside B of the rotary machine along the axial direction Da of the rotating shaft 12 against the biasing force of the coil spring 515 by a pressure of the seal gas. Accordingly, a minute seal gap is formed between the rotating ring 511 and the stationary ring 513. In this way, the minute gap is formed in the second dry gas seal portion 51b, and thus, a portion between the rotating shaft 12 and the casing 11 is sealed by the second dry gas seal portion 51b. Moreover, the seal gas which has flowed into the third space S3 flows into the second space S2 protruding toward the inside A of the rotary machine through the second labyrinth seal portion 52b, and a portion of the seal gas flows toward the outside B of the rotary machine through the second dry gas seal portion 51b. The seal gas which has flowed into the second space S2 is fed to the flare stack via the second drain pipe 54b. Moreover, the seal gas which has flowed through the second dry gas seal portion 51b flows into the fourth gas flow path 60d via the fourth space S4. The seal gas which has flowed into the fourth gas flow path 60d is fed to the fourth drain pipe 54d. The seal gas which has flowed into the fourth drain pipe 54d is fed to the vent through the second seal gas discharge pipe 57d by closing the fourth adjusting valve 55d.

Moreover, an inert gas is fed from a supply source (not shown) to the separation gas supply pipe 57e as the seal gas. The seal gas which has flowed through the separation gas supply pipe 57e flows into the fifth gas flow path 60e through the fifth drain pipe Me by closing the fifth adjusting valve 55e. The seal gas which has flowed through the fifth gas flow path 60e is supplied to the separation seal portion 53. After the seal gas supplied to the separation seal portion 53 is used to seal the portion between the rotating shaft 12 and the casing 11, the seal gas flows to the fourth space S4 or the outside B of the rotary machine.

Moreover, the compressor 10 stops and a temperature or a pressure in the shaft insertion hole 111 decreases, and thus, the seal gas is liquefied and the drain is generated. Specifically, the first space S1 will be described as an example. The drain generated in the first space s1 enters the first gas flow path 60a. Thereafter, a liquid drain is collected in a lower side of the first gas flow path 60a in the vertical direction. The collected drain flows into the first drain pipe 54a connected to the lowest portion of the first gas flow path 60a in the vertical direction. The drain flowing through the first drain pipe 54a downward in the vertical direction is collected around the first adjusting valve 55a by closing the first adjusting valve 55a. Similarly, the drain collected in the second gas flow path 60b, the third gas flow path 60c, the fourth gas flow path 60d, and the fifth gas flow path 60e flows into the second drain pipe 54b, the third drain pipe 54c, the fourth drain pipe 54d, and the fifth drain pipe 54e, respectively. Thus, the drain is collected around the adjusting valve 55. In this state, the drain is discharged to the outside by opening each adjusting valve 55.

As described above, according to the compressor 10, the gas flow pipe 57 is connected to the casing 11 via the drain pipe 54. Specifically, the first seal gas supply pipe 57a will be described as an example. The first seal gas supply pipe 57a through which the seal gas flows is connected to the casing 11 via the first drain pipe Ma through which the drain flows. Since the first drain pipe Ma is connected to the lower portion of the casing 11 in the vertical direction, the drain collected in the first gas flow path 60a can flow to the first drain pipe Ma using gravity. In addition, the seal gas which flows through the first seal gas supply pipe 57a is a gas, and thus, the seal gas is not influenced even when the drain is supplied from the lower portion of the casing 11 in the vertical direction. Accordingly, it is possible to connect the first drain pipe 54a and the first seal gas supply pipe 57a to the casing 11 by one connection portion without impairing the flow states of the seal gas and the drain with respect to the first gas flow path 60a. Therefore, it is possible to reduce the number of pipes directly connected to the casing 11. That is, it is possible to prevent the first drain pipe 54a and the first seal gas supply pipe 57a from being respectively connected to the casing 11 at different positions, and to prevent the number of the connection portions of the pipes in the casing 11 from increasing. In addition, in the first seal gas discharge pipe 57b, the second seal gas supply pipe 57c, the second seal gas discharge pipe 57d, and the separation gas supply pipe 57e, similar effects are exerted.

In addition, with respect to the drain pipe 54 extending downward in the vertical direction, the gas flow pipe 57 is inclined upward with respect to the horizontal direction. Specifically, the first seal gas supply pipe 57a will be described as an example. Even when the drain flowing through the first drain pipe 54a downward in the vertical direction toward the first adjusting valve 55a reaches the connection portion between the first drain pipe 54a and the first seal gas supply pipe 57a, the drain does not flow obliquely upward. With respect to this, the first seal gas supply pipe 57a extends obliquely upward from the first drain pipe 54a extending downward in the vertical direction. Accordingly, it is possible to prevent the drain from flowing into the first seal gas supply pipe 57a. Even when the first seal gas supply pipe 57a extends upward, a flow state of the seal gas is not easily influenced. Accordingly, it is possible to effectively discharge the drain without impairing the flow state of the seal gas. In addition, in the first seal gas discharge pipe 57b, the second seal gas supply pipe 57c, the second seal gas discharge pipe 57d, and the separation gas supply pipe 57e, similar effects are exerted. Accordingly, it is possible to prevent the drain from flowing into the supply source or a discharge destination of the seal gas without impairing the flow states of the seal gas and the drain.

Particularly, like the first seal gas discharge pipe 57b through which the seal gas is discharged and the first drain pipe 54a, in a case where the pipes having the same flow directions of the drain and the seal gas are connected to each other, even when the first seal gas discharge pipe 57b extends obliquely upward, the flow of the seal gas is not inhibited.

Moreover, each check valve 58 is provided in each gas flow pipe 57. Specifically, the first seal gas supply pipe 57a will be described as an example. The first check valve 58a is provided in the first seal gas supply pipe 57a. Accordingly, even if the drain flows into the first seal gas supply pipe 57a, it is possible to prevent the drain flowing inward from the first check valve 58a. In the first check valve 58a, the flow of the seal gas forward of the first drain pipe 54a is not inhibited. Similarly, in the first seal gas discharge pipe 57b, the second seal gas supply pipe 57c, the second seal gas discharge pipe 57d, and the separation gas supply pipe 57e, similar effects are exerted. Accordingly, it is possible to accurately prevent the liquid drain flowing through the drain pipe 54 from flowing inward from the gas flow pipe without inhibiting the flow state of the seal gas.

In addition, each sight glass 56 is provided in each drain pipe 54. Specifically, the first drain pipe 54a will be described as an example. In the first drain pipe 54a, the first sight glass 56a is provided in the vicinity of the first adjusting valve 55a. Accordingly, an amount of the drain in the first drain pipe 54a collected around the first adjusting valve 55a is visually recognized by the sight glass 56, and thus, it is possible to easily check the amount. Accordingly, it is possible to open the first adjusting valve 55a in a state where the drain having a certain amount is collected in the first drain pipe 54a. Moreover, the sight glass 56 is provided in each of the second drain pipe 54b, the third drain pipe 54c, the fourth drain pipe 54d, and the fifth drain pipe 54e, and thus, similar effects are exerted. Therefore, it is possible to appropriately discharge the drain in the drain pipe 54.

Although the embodiment of the present invention has been described above in detail with reference to the drawings, the respective configurations and combinations thereof in each embodiment are merely examples, and additions, omissions, substitutions, and other changes of configurations are possible within a scope which does not depart from the gist of the present invention. In addition, the present invention is not limited by the embodiment, but is limited by only the claims.

Moreover, in the above-described embodiment, the compressor 10 is exemplified as the rotary machine. However, the present invention is not limited to this. For example, the rotary machine may be various turbines 20 or electric motors.

In addition, the drain pipe 54 is not limited to the drain pipe 54 extending straight from the lowest portion of the casing 11 in the vertical direction. The drain pipe 54 may extend to be inclined downward in the horizontal direction and the vertical direction from a position slightly deviated from the lowest portion of the casing 11 in the vertical direction.

INDUSTRIAL APPLICABILITY

According to the above-described compressor 10, it is possible to reduce the number of pipes directly connected to the casing 11.

REFERENCE SIGNS LIST

1: rotary machine system
10: compressor
11: casing
111: shaft insertion hole
60: gas flow path
60a: first gas flow path
60b: second gas flow path 60c: third gas flow path
60d: fourth gas flow path
60e: fifth gas flow path
12: rotating shaft
C: axis
50: seal portion
51: dry gas seal portion
511: rotating ring
512: shaft sleeve
513: stationary ring
514: retainer
515: coil spring
51a: first dry gas seal portion
51b: second dry gas seal portion
52: labyrinth seal portion
52a: first labyrinth seal portion
52b: second labyrinth seal portion
53: separation seal portion
S1: first space
S2: second space
S3: third space
S4: fourth space
54: drain pipe
54a: first drain pipe
54b: second drain pipe
54c: third drain pipe
54d: fourth drain pipe
54e: fifth drain pipe
55: adjusting valve
55a: first adjusting valve
55b: second adjusting valve
55c: third adjusting valve
55d: fourth adjusting valve
55e: fifth adjusting valve
56: sight glass
56a: first sight glass
56b: second sight glass
56c: third sight glass
56d: fourth sight glass
56e: fifth sight glass
57: gas flow pipe
58: check valve
57a: first seal gas supply pipe
58a: first check valve
57b: first seal gas discharge pipe
58b: second check valve
57c: second seal gas supply pipe
58c: third check valve
57d: second seal gas discharge pipe
58d: fourth check valve
57e: separation gas supply pipe
58e: fifth check valve
20: turbine
Da: axial direction
Dr: radial direction
Dc: circumferential direction
A: inside of rotary machine
B: outside of rotary machine

What is claimed is:

1. A rotary machine comprising:
a rotating shaft which is rotatably provided around an axis extending in a horizontal direction;
a casing which covers the rotating shaft from an outside in a radial direction of the rotating shaft and in which a gas flow path extending in a circumferential direction of the rotating shaft is formed;
a rotating ring which integrally rotates with the rotating shaft;
a stationary ring which is provided in the casing, abuts against the entire periphery of the rotating ring when the rotating shaft stops, and forms a seal gap between the rotating ring and the stationary ring by a seal gas flowing through the gas flow path when the rotating shaft rotates;
a drain pipe which is connected to a lower portion in a vertical direction of the casing and communicates with the gas flow path;
an adjusting valve which is provided in the drain pipe and adjusts a flow state of a fluid in the drain pipe; and
a gas flow pipe which is connected to the drain pipe at a position closer to a connection portion between the casing and the drain pipe than the adjusting valve and through which the seal gas flows.

2. The rotary machine according to claim 1, wherein the gas flow pipe is a seal gas supply pipe through which the seal gas to be supplied to the gas flow path flows.

3. The rotary machine according to claim 2, wherein the gas flow pipe extends from the drain pipe in a direction including an upper side in the vertical direction.

4. The rotary machine according to claim 3, wherein a check valve is provided in the gas flow pipe.

5. The rotary machine according to claim 2, wherein a check valve is provided in the gas flow pipe.

6. The rotary machine according to claim 1, wherein the gas flow pipe is a seal gas discharge pipe through which the seal gas discharged from the gas flow path flows.

7. The rotary machine according to claim 6, wherein the gas flow pipe extends from the drain pipe in a direction including an upper side in the vertical direction.

8. The rotary machine according to claim 7, wherein a check valve is provided in the gas flow pipe.

9. The rotary machine according to claim 6, wherein a check valve is provided in the gas flow pipe.

10. The rotary machine according to claim 1, wherein the gas flow pipe extends from the drain pipe in a direction including an upper side in the vertical direction.

11. The rotary machine according to claim 10, wherein a check valve is provided in the gas flow pipe.

12. The rotary machine according to claim 1, wherein a check valve is provided in the gas flow pipe.

13. The rotary machine according to claim 1, wherein the drain pipe includes a window portion through which an inside of the drain pipe is checked.

* * * * *